United States Patent
Welton et al.

(10) Patent No.: US 8,838,634 B1
(45) Date of Patent: Sep. 16, 2014

(54) CUSTOM USER PARALLEL DATA IMPORT AND EXPORT

(75) Inventors: Caleb E. Welton, Foster City, CA (US); Alon Goldshuv, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 33 days.

(21) Appl. No.: 13/436,419

(22) Filed: Mar. 30, 2012

(51) Int. Cl.
*G06F 7/00* (2006.01)

(52) U.S. Cl.
USPC .......................................................... 707/758

(58) Field of Classification Search
USPC .................................. 707/758, 795
See application file for complete search history.

(56) References Cited

U.S. PATENT DOCUMENTS

2004/0249968 A1* 12/2004 Srivstava ...................... 709/231
2006/0020783 A1* 1/2006 Fisher ........................... 713/156

* cited by examiner

*Primary Examiner* — Truong Vo
(74) *Attorney, Agent, or Firm* — Van Pelt, Yi & James LLP

(57) ABSTRACT

Formatting data is disclosed. An indication of a specified data to be formatted between a format of a database and a format external to database is received. A formatter of the database is used to format the specified data between the format of the database and the format external to the database. The formatter has been integrated with the database using a formatter code defined external to the database.

20 Claims, 7 Drawing Sheets

CUSTOM USER PARALLEL DATA IMPORT AND EXPORT

BACKGROUND OF THE INVENTION

Traditionally, in order to import data into a database, the data to be imported had to be in a format that is natively supported by the database. Likewise, to export data from a database, the exported data had to be in a format that is natively supported by the database. However, data is often in or desired to be in a format not natively supported by the database. Although standalone converters could possibly be used to convert data to desired formats, using an additional standalone converter is inefficient (e.g., performance inefficiency) and prone to loss of information during the multiple conversion processes (e.g., due to incompatibility between various formats). Additionally, a communication protocol used to import and export data from a database often must be a protocol natively supported by the database. However in certain instances, it is desirable to use a protocol not natively supported by the database. Therefore, there exists a need for a better way to import and export data from a database.

BRIEF DESCRIPTION OF THE DRAWINGS

Various embodiments of the invention are disclosed in the following detailed description and the accompanying drawings.

DETAILED DESCRIPTION

Figure 1:
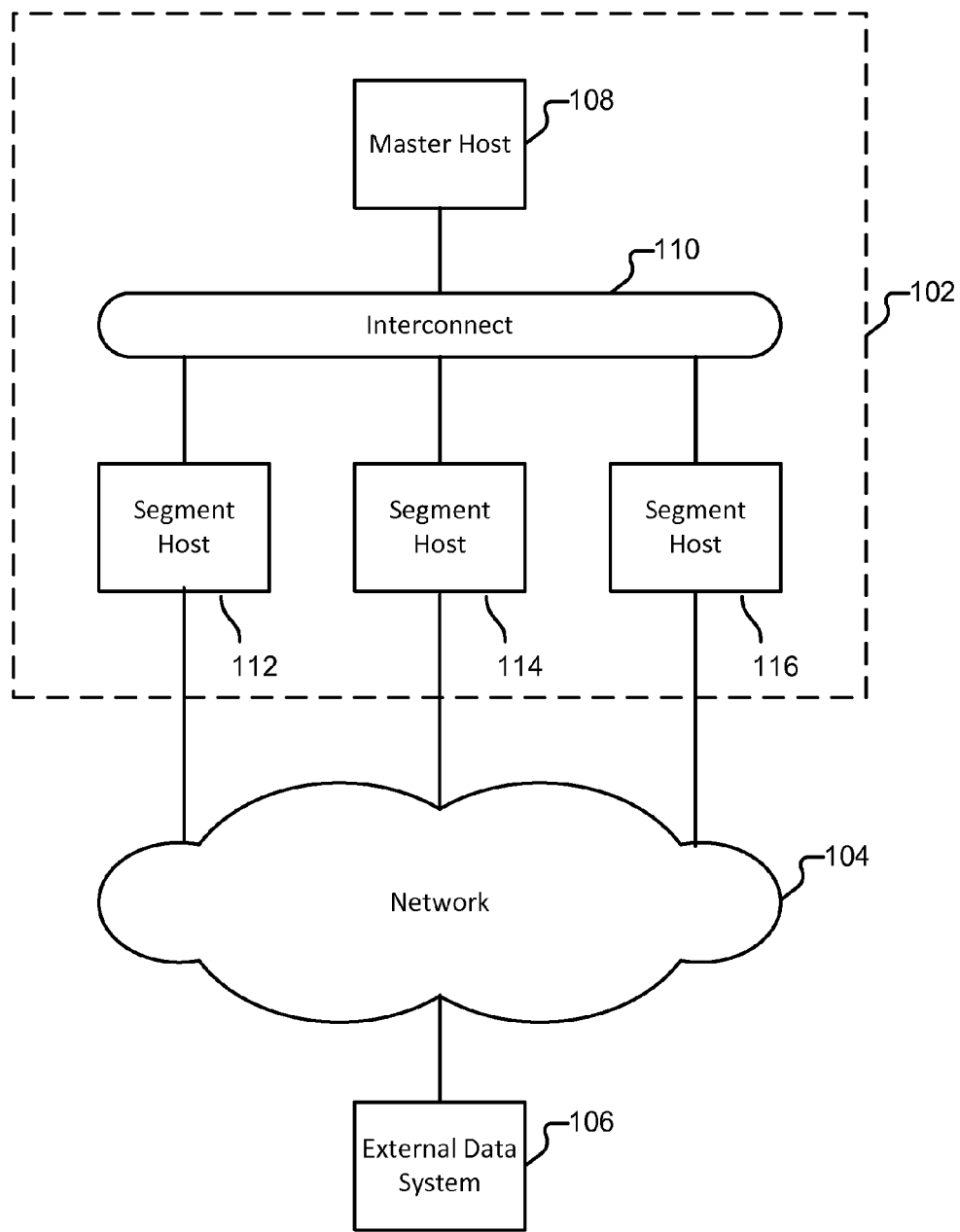
FIG. 1 is a block diagram illustrating an embodiment of a system for formatting and transferring data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, data is formatted between a format of a database and a format external to the database. For example, the formatting is performed in the context of importing data into a database and/or exporting data from the database. The data is formatted using a formatter of the database. For example, a third party provides a formatter that is stored, invoked and executed on a system of the database to format data. In some embodiments, the format external to the database includes a format that is different from the format of the database. In some embodiments, the format external to the database includes a format of a data to be imported or a format of an exported data by the database. In some embodiments, the format external to the database includes a format not natively supported by the database. For example, the database is unable to export/import data to/from the format not natively supported by the database without using a formatter code defined external to the database (e.g., defined/provided by an entity external to an entity of the database). In some embodiments, the formatter has been integrated with the database using a formatter code defined external to the database. For example, the formatter has been integrated with the database at least in part by being configured to communicate directly with the database and/or execute in a system of the database.

In some embodiments, data to be imported/exported is transferred using a communication protocol not natively supported by the database. For example, a communication protocol not natively supported by the database is desired to enable a more efficient and/or secure communication. In some cases the protocol not natively supported by the database is associated with the format not natively supported by the database. In another example, the protocol not natively supported by the database is associated with a data source/destination external to the database. In some embodiments, protocol code of the protocol not natively supported by a database is received from a third party and a system of the database stores, invokes and executes the protocol code in order to transfer data using the protocol not natively supported by the database. In various embodiments, the protocol controls establishing a communication connection (e.g., handshake and authentication of parties of the communication) and transfer of data via the connection. In some embodiments, the communication protocol not natively supported by the database includes a communication protocol that the database cannot use without using a protocol code defined external to the database (e.g., defined/provided by an entity external to an entity of the database).

FIG. 1 is a block diagram illustrating an embodiment of a system for formatting and transferring data. Database system 102 is connected to external data system 106 via network 104. Network 104 and interconnect 110 may include one or more of the following: a direct or indirect physical communication connection, mobile communication network, Internet, intranet, Local Area Network, Wide Area Network, Storage Area Network, and any other forms of connecting two or more systems or storage devices together. In some embodiments, external data system 106 provides at least a portion of data to be imported into database system 102. In some embodiments, external data system 106 is a destination of data to be exported from database system 102. In various embodiments, communication between database system 102 and external data system 106 is at least in part performed using a protocol not natively supported by one or more components of database system 102.

In some embodiments, external data system 106 uses a distributed file system such as a Hadoop Distributed File System of The Apache Software Foundation. For example, external data system 106 includes a plurality of database nodes. In some embodiments, external data system 106 includes an ETL (Extraction, Transformation and Loading) server. In various embodiments, external data system 106 includes data storage and/or is connected to an external data storage directly and/or via network 104. In some embodiments, external data system 106 includes a plurality of network interface controllers (i.e., NIC) and each NIC is connected to a plurality of hosts of database system 102. Database system 102 includes master host 108 connected to segment hosts 112, 114 and 116 via interconnect 110. In other embodiments, interconnect 110 is connected to network 104. For example, segment hosts 112, 114 and 116 are connected to external data system 106 via interconnect 110, which is connected to network 104.

In some embodiments, each of segment hosts 112, 114 and 116 establishes a different connection to external data system 106 via network 104. For example, each segment host connects to a different set of programs, NICs, or hosts included in external data system 106. In some embodiments, one or more of segment hosts 112, 114 and 116 establish a plurality of connections with external data system 106. For example, segment host 112 established a first connection to a first NIC or host of external data system 106 and a second connection with a second NIC or host of external data system 106. Although three segment hosts have been shown in FIG. 1, any number of segment hosts or any other component shown in the figure may exist in various embodiments.

In some embodiments, database system 102 includes the Greenplum Database offered by EMC, Inc. of Hopkinton, Mass. that leverages parallel architecture of the Hadoop Distributed File System. Database system 102 utilizes a shared-nothing MPP (massively parallel processing) architecture. In this architecture, database data is automatically partitioned across multiple segment hosts/servers (i.e., segment hosts 112, 114 and 116), and each segment host owns and manages a distinct portion of the overall database. Communication between hosts 108, 112, 114 and 116 are performed via a network interconnect 110. In some embodiments, database system 102 utilizes a shared-nothing MPP architecture that provides every segment host with a dedicated, independent high-bandwidth channel to its individual storage. The segment hosts are able to process database queries in a fully parallel manner, use all storage connections simultaneously, and efficiently flow data between segment hosts as needed. Master host 108 manages segment hosts 112, 114 and 116. For example, master host 108 provides query planning, query dispatch and/or coordinates MapReduce for database system 102.

Figure 2:
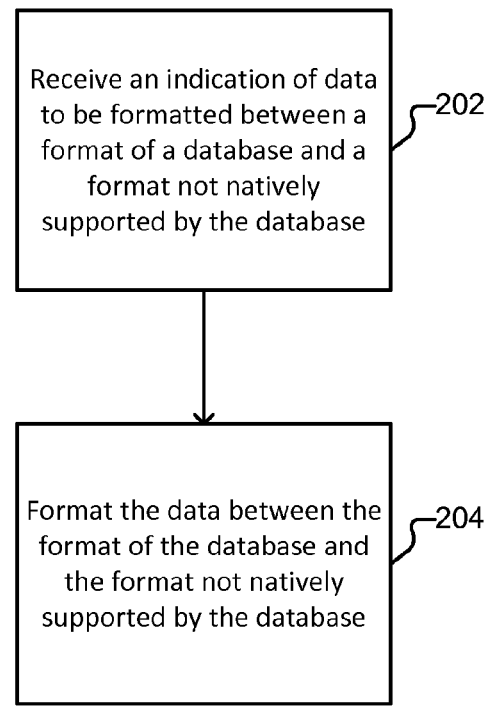
FIG. 2 is a flow chart illustrating an embodiment of a process for formatting data.

FIG. 2 is a flow chart illustrating an embodiment of a process for formatting data. This process may be implemented on database system 102 of FIG. 1. At 202, an indication of data to be formatted between a format of a database and a desired format not natively supported by the database is received. In some embodiments, the indicated data is data to be imported into the database and is being formatted from the format not natively supported by the database to the format of the database. In some embodiments, the indicated data is a data to be exported from the database and is being formatted to the format not natively supported by the database from the format of the database. For example, data of database system 102 is exported to external data system 106 of FIG. 1 in a format not natively supported by database system 102. In some embodiments, a format not native to the database includes a format that cannot be imported or exported by the database using a formatter natively provided by the database. For example, data of external data system 106 in a format not natively supported by database system 102 is imported into database system 102 of FIG. 1. An example of a database includes one or more components and/or the entire database system 102 of FIG. 1. In some embodiments, the format of the database includes a format of data stored in the database (e.g., database table format).

At 204, the data is formatted between the format of the database and the format not natively supported by the database. In some embodiments, formatting the data includes importing data from a format not native to the database to the database using a formatter provided to the database. In some embodiments, formatting the data includes exporting data from a database to a format not native to the database using a formatter provided to the database. For example, a formatter provided to database system 102 is used by system 102 to format data to/from external data system 106. An example of a formatter includes an object (e.g., a programming function) of a database that can be used to convert data from one format to another. In some embodiments, formatting the data includes creating an object in the database that represents the external data being imported/exported. To import data, for example, a special readable database table from which imported data can be accessed is created, and to export data, a special writeable table to which data to be exported can be written is created. In some embodiments, formatting data includes extracting, transforming and/or loading data. In some embodiments, formatting data includes using a plurality of hosts to load/unload and process data in parallel. In some embodiments, formatting the data includes using a non-parallel load/unload mechanism (e.g., database COPY command) as a simple way to move data in or out of the database in a single transaction, without the overhead of creating a special database table for import/export.

Figure 3:
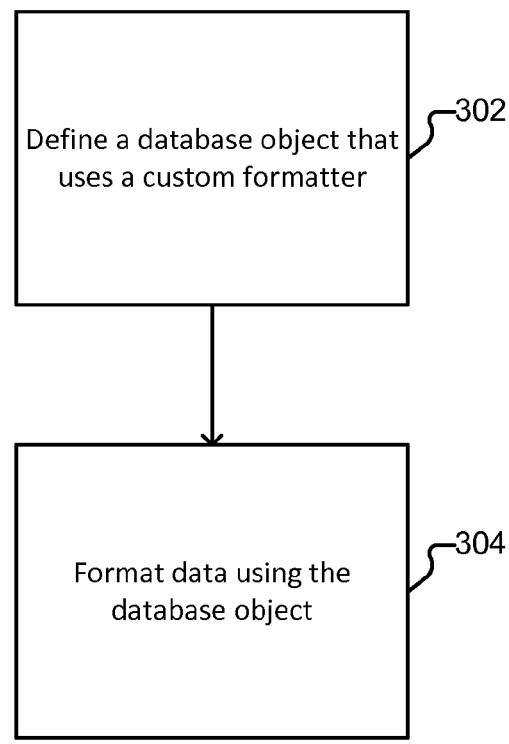
FIG. 3 is a flow chart illustrating an embodiment of a process for formatting data using a database object.

FIG. 3 is a flow chart illustrating an embodiment of a process for formatting data using a database object. In some embodiments, the process of FIG. 3 is included in 204 of FIG. 2. This process may be implemented on one or more components of database system 102 of FIG. 1. At 302, a database object that uses a custom formatter is defined. The custom formatter is a formatter not natively provided by the database associated with the formatter.

In some embodiments, the custom formatter is associated with program code received by a system of the database from an external party (e.g., a third-party interested in allowing support for the format by the database). The formatter is an example of the database object that can be used to format data from one format to another format. For example, the formatter is a programming language function that is stored by the database and can be invoked by the database. In another example, the formatter has access to one or more connections of the database to read and/or write to the database. In some embodiments, a first formatter is used to format data from a first format to a second format and a different second formatter used to format data from the second format to the first format.

In some embodiments, defining the database object includes defining a special type database table. This special table allows access to data external to the database as though the data is an object of the database. For example, data can be written to the table to export data and data can be read from the table to access imported data. The special table can be queried using database commands such as Structured Query Language (SQL) commands (e.g., select, join or sort database commands). In some embodiments, two different types of tables, one for data export and one for data import, exists. For the data import table, Data Manipulation Language operations (e.g., UPDATE, INSERT, DELETE, or TRUNCATE database commands) are not allowed whereas for the data export table, the INSERT database command operation is allowed (UPDATE, DELETE and TRUNCATE are still not allowed).

In some embodiments, the table is either file-based (e.g., table is associated with one or more static flat files) or web-based (e.g., table is associated with dynamic web sources). For example, when a query is planned using a file-based table, the table is considered re-scannable because the data in the table is considered static for the course of the query, whereas when a query is planned using a web-based table, data in the table is not re-scannable because there is the possibility that the data could change during the course of the execution of the query.

Below is an example of code for creating a table for importing data in a Greenplum Database.
CREATE READABLE EXTERNAL TABLE students (name varchar(20), address varchar(30), age int)
LOCATION ('file://<host>/file/path/')
FORMAT 'CUSTOM' (formatter=fixedwidth_in, name=20, address=30, age=4);
The table above is named "students" and the data to be imported is located at "<host>/file/path/" and accessed using the "file://" protocol. The formatter to be used to format the data to be imported is a custom formatter named "fixedwidth_in." The formatter is provided custom user defined parameters "name=20, address=30, age=4" that reflect table column names ("name", "address", "age"). In other embodiments, other parameters may be custom defined by a user.

Below is an example of code for creating a table for exporting data in a Greenplum Database.
CREATE WRITEABLE EXTERNAL TABLE students (name varchar(20), address varchar(30), age int)
LOCATION ('file://<host>/file/path/')
FORMAT 'CUSTOM' (formatter=fixedwidth_out, name=20, address=30, age=4);
The table above is named "students" and the data is to be exported to location "<host>/file/path/" using the "file://" protocol. The formatter to be used to format the exported data is a custom formatter named "fixedwidth_out" The formatter is provided custom user defined parameters "name=20, address=30, age=4" that reflect table column names ("name", "address", "age"). In other embodiments, other parameters may be custom defined by a user.

In some embodiments, creating the database object includes utilizing a plurality of database segments (such as the segment hosts 112, 114 and 116 of FIG. 1) to read and/or write in parallel across multiple hosts/streams of data. In some embodiments, creating database objects include receiving an indication of a protocol to be used to transfer data to/from an external system, program or data location.

At 304, data is formatted using the database object. In some embodiments, formatting the data includes importing data including by formatting data from a format not native to the database to a format of the database. For example, after a table database object for importing data is created, the table is populated with at least a portion of the data from an external data source. The data from the external source may be obtained at an indicated location using an indicated communication protocol. The data to be imported is in a format not native to the database and the data is formatted to the format of the database using the custom formatter of 302. The format of the database includes the format of the data in or obtained from the database. After the database table for import is populated, the table can be queried to obtain imported data and database operations such as select, join and sort commands that can be performed on the data of the table.

In some embodiments, formatting the data includes exporting the data including by formatting data in the database to a format not native to the database. For example, after a table database object for data export is created, data is exported by selecting data already in the database and writing the selected data to the table of the data export using an INSERT database command operation. The process of writing data to the export table utilizes a formatter of 302 to convert the written data to the format not native to the database. The destination of the exported data may include a file, a named pipe or to another executable program (e.g., send to a program that is connected to another database or translation tool to load the data elsewhere). In some cases, the export table is used as an output target for parallel MapReduce calculations.

Figure 4:
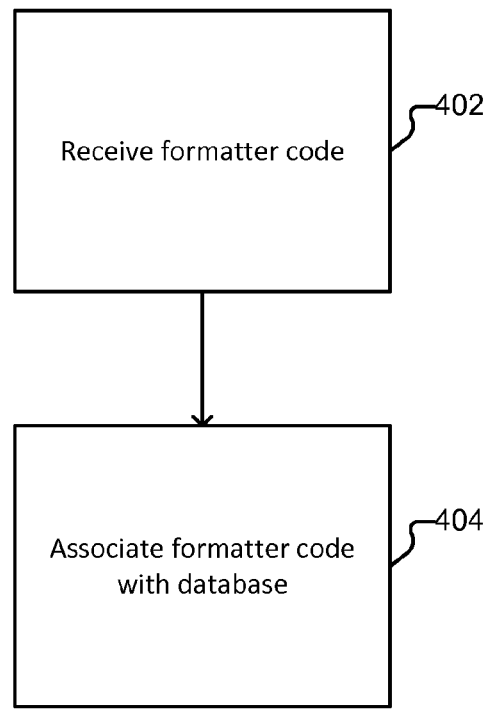
FIG. 4 is flowchart illustrating an embodiment of a process for receiving a formatter.

FIG. 4 is flowchart illustrating an embodiment of a process for receiving a formatter. In various embodiments, the formatter of FIG. 4 is the formatter discussed with the process of FIG. 2 and/or FIG. 3. The process of FIG. 4 may be implemented on one or more components of database system 102 of FIG. 1.

At 402, formatter code is received. The formatter code can be used by a database system to format data from one format to another format. In some embodiments, the received formatter code includes a source code that can be complied to at least in part generate a formatter. In some embodiments, the received formatter code is received as compiled code. In some embodiments, the formatter code is received from a party external to a database system. For example, the formatter code is received from an entity associated a data format that is not natively supported by the database system. In some embodiments, the formatter code is at least in part generated using an application programming interface (API) provided by the database or a trusted entity of the database (e.g., a provider of the database system). In some cases, the entity of the database protects the security of the database that will be utilizing the code by only allowing a third party to provide formatter code generated using the provided API. In some embodiments, the received formatter code is validated before the formatter code is associated with a database. For example, the formatter code is checked for security, correctness, compatibility and/or efficiency.

At 404, the received formatter code is associated with a database. In some embodiments, associating the formatter code includes compiling formatter code as one or more programming functions of the database. In some embodiments, the formatter code has been received as one or more functions that have complied. The functions may include a function for importing data as well as a different function for exporting data. In some embodiments, associating the formatter code with the database system includes registering one or more programming functions of the formatter code with a shared library of programming functions of the database system. For example, an instruction is issued to the database to create a programming function that can be used by the database to format data. The shared library includes one or more programming functions that can be used to program the database. In various embodiments, the one or more functions associated with the database in 404 are used to format data in 204 of FIGS. 2 and 304 of FIG. 3.

Figure 5:
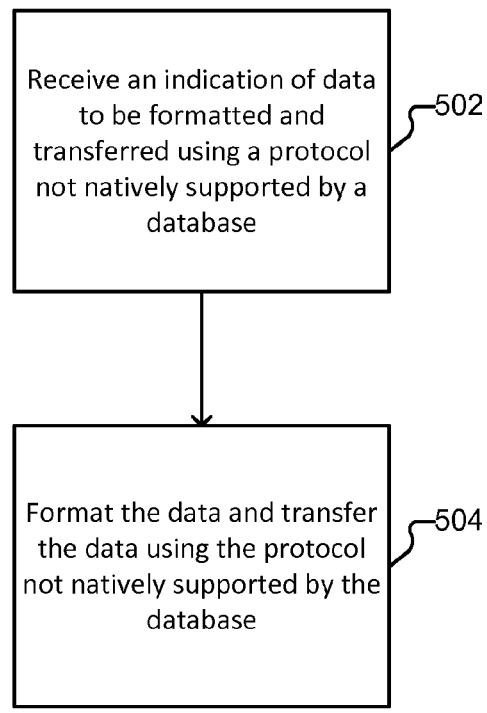
FIG. 5 is a flow chart illustrating an embodiment of a process for formatting data.

FIG. 5 is a flow chart illustrating an embodiment of a process for formatting data. This process may be implemented on one or more components of database system 102 of FIG. 1. At 502, an indication of data to be formatted and transferred using a communication protocol not natively supported by a system of a database is received. In various embodiments, the data is to be formatted to export/import data to/from the database and the formatting and transferring could take place in either order, as appropriate. In some embodiments, the process of 502 is included in 202 of FIG. 2.

At 504, the data is formatted and transferred using the protocol not natively supported by a system of the database. In some embodiments, transferring the data includes establishing a connection between a system of the database and an external data system (e.g., the connection between database system 102 and external data system 106 of FIG. 1). The communication over the established data connection is controlled using the protocol not natively supported by the database. In some embodiments, the protocol not natively supported by the database is supported by the database using a custom protocol code received from a trusted third party entity and/or the entity of the data transfer. In some embodiments, the process of 504 is included in 204 of FIG. 2.

Figure 6:
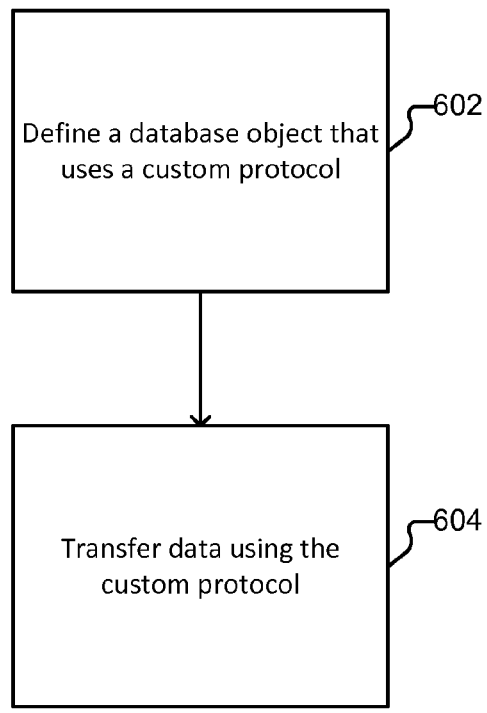
FIG. 6 is a flow chart illustrating an embodiment of a process for importing and exporting data.

FIG. 6 is a flow chart illustrating an embodiment of a process for importing and exporting data. In some embodiments, the process of FIG. 6 is included in 204 of FIG. 2 and/or 504 of FIG. 5. This process may be implemented on one or more components of database system 102 of FIG. 1. At 602, a database object that uses a custom protocol is defined. In some embodiments, the custom protocol is associated with custom code received by a database from an external party (e.g., a third party interested in enabling the database to support the protocol not natively supported by the database). The custom protocol is associated with program code that controls establishing a communication connection and transferring data via the connection. For example, the custom protocol is a database protocol object that is stored and used by the database. In some embodiments, a first protocol used to transfer data from a first program to a second program is different from a second protocol used to transfer data from the second system to the first system. In another embodiment, a single protocol is used for both directions of a communication.

In some embodiments, defining the database object includes defining a special type of database table such as the table described along with FIGS. 3 and/or 4. In some embodiments, the table is either file-based (e.g., table is associated with static flat files) or web-based (e.g., table is associated with dynamic web sources). In some embodiments, defining the table includes specifying a protocol to be used when establishing a communication and communicating with an external data source/destination. In some embodiments, a custom protocol can be only used by identified users. For example, a permission to use a specific type of custom protocol can be granted to one or more specified users.

Below is an example of code that can be executed on a Greenplum Database for creating a table for importing data using a custom protocol named "myprot://".
CREATE READABLE EXTERNAL TABLE students (name varchar(20), address varchar(30), age int)
LOCATION ('myprot://<host>/file/path/')
FORMAT 'CUSTOM' (formatter=fixedwidth_in, name=20, address=30, age=4);

The table created above is named "students" and the data to be imported is located at "<host>/file/path/" and can be accessed using the "myprot://" protocol. The formatter to be used to format the data to be imported is a custom formatter named "fixedwidth_in". In other embodiments, a standard formatter that is not a custom formatter may be used.

Below is an example of code that can be executed on a Greenplum database for creating a table for exporting data using a custom protocol named "myprot://".
CREATE WRITEABLE EXTERNAL TABLE students (name varchar(20), address varchar(30), age int)
LOCATION ('myprot://<host>/file/path/')
FORMAT 'TEXT';
The table created above is named "students" and the data is to be exported to location "<host>/file/path/" using "myprot://" protocol. The formatter to be used to format the data to be exported is a native formatter that supports text formatting native to the database.

In some embodiments, creating the database object utilizing the custom protocol includes utilizing a plurality of database segments (such as the segment hosts 112, 114 and 116 of FIG. 1) to read and/or write in parallel across multiple hosts/streams of data using the custom protocol. In some embodiments, creating the database object includes receiving an indication of a custom formatter to be used to format data to be exported/imported.

At 604, data is transferred using the custom protocol. In some embodiments, transferring the data includes establishing a connection with a data source/destination. For example, handshake and authentication of parties of the communication are controlled using the custom protocol. The connection may be established with a system, a database, a program or any type of data source/destination. In some embodiments, transferring the data includes importing data by using a data import programming function of the custom protocol. For example, after a table database object for data import is created, the table is populated with at least a portion of the data transferred from an external data source using the import function of the custom protocol. After the table for import is populated, the table can be queried for data and database operations such as select, join, and sort can be performed on the data of the table.

In some embodiments, transferring the data includes exporting the data by using a data export function of the custom protocol. For example, after a table database object for data export is created, data can be exported by selecting data already in the database and writing data to the data export table using an INSERT database command operation. The process of writing data to the export table utilizes an export function of the custom protocol to transfer the formatted data to an external destination. The destination of the exported data may include a file, a named pipe or to another executable program (e.g., send to a program that is connected to another database or translation tool to load the data elsewhere). In some cases, the export table is used as an output target for parallel MapReduce calculations.

Figure 7:
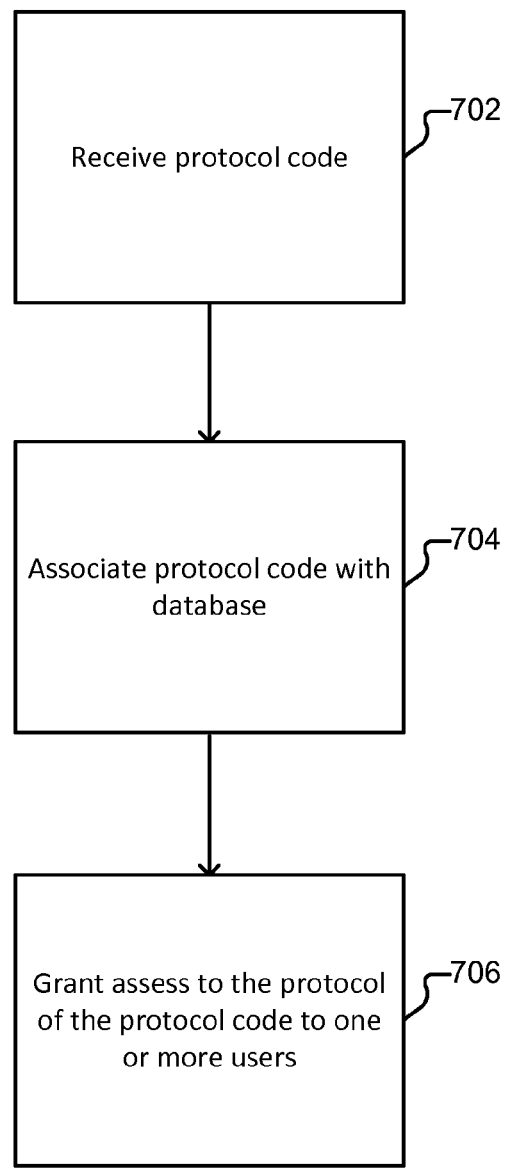
FIG. 7 is a flowchart illustrating an embodiment of a process for processing a custom protocol code.

FIG. 7 is a flowchart illustrating an embodiment of a process for processing a custom protocol code. The process of FIG. 7 may be implemented on one or more components of database system 102 of FIG. 1.

At 702, protocol code is received. The protocol code can be used by a database system to establish a connection and transfer data to an external data source/destination. In some embodiments, the received protocol code includes a source code that can be compiled to at least in part generate a usable custom protocol. In some embodiments, the received protocol code is received as compiled code. In some embodiments, the protocol code is received from a party external to a database system. For example, the protocol code is received from an entity associated with a protocol that is not natively supported by the database. In some embodiments, the protocol code is at least in part generated using an API provided by a trusted entity of the database (e.g., a provider of the database). In some cases, the entity of the database protects the security of the database that will be utilizing the protocol code by only allowing a third party to provide protocol code generated using the provided API. In some embodiments, the received protocol code is validated before the protocol code is associated with a database. For example, the protocol code is checked for security, correctness, compatibility, and/or efficiency.

At 704, the received protocol code is associated with a database. In some embodiments, associating the protocol code includes compiling protocol code as one or more program functions. In some embodiments, the protocol code has been received as one or more functions that have complied. The complied functions may include a function for transferring imported data as well as a different function for transferring exported data. In some embodiments, associating the protocol code with the database system includes associating one or more programming functions of the protocol code with a shared library of program functions of the database system. For example an instruction is issued in the database system to create a programming function that can be used by the database system to transfer data. The following example code that can be executed on a Greenplum Database creates two "C" programming language functions, "myread" (i.e., import function of the protocol) and "mywrite" (i.e., export function of the protocol that can be used to define a custom protocol).

CREATE FUNCTION myread( ) RETURNS integer
as '$libdir/gpextprotocl.so', 'myprot_import'
LANGUAGE C STABLE;
CREATE FUNCTION mywrite( ) RETURNS integer
as '$libdir/gpextprotocl.so', 'myprot_export'
LANGUAGE C STABLE;

In some embodiments, associating the protocol code includes defining a protocol that identifies functions to be used during data communication. In the example below, a protocol named "myprot://" is defined in the Greenplum Database as a protocol that uses the function "myread" when reading data and function "mywrite" when writing data.

CREATE TRUSTED PROTOCOL
myprot (readfunc='myread', writefunc='mywrite');

In the example above, the protocol is labeled as "TRUSTED" to identify that only specified user(s) may utilize the protocol. In some embodiments, the "TRUSTED" label is optional. For example, a protocol not labeled as "TRUSTED" specified that any user may utilize the protocol.

At 706, access to the protocol of the protocol code is granted to one or more users. In some embodiments, granting the access includes instructing a system of the database to only allow specified user(s) to utilize the protocol (e.g., to protect the security of the system). For example, in the context of the Greenplum Database, access must be granted to a user before the user can use a protocol that has been labeled as "TRUSTED".

The following code executed on the Greenplum Database allows a specified user to create a readable external table with the specified custom protocol.
GRANT SELECT ON PROTOCOL <protocol name> TO <user name>;
The following code executed on the Greenplum Database allows a specified user to create a writeable external table with the specified custom protocol.
GRANT INSERT ON PROTOCOL <protocol name> TO <user name>;
The following code executed on the Greenplum Database allows a specified user to create a readable and writable external table with the specified custom protocol.
GRANT ALL ON PROTOCOL <protocol name> TO <user name>;

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of formatting data, comprising receiving an indication of a specified data to be formatted between a format of a database and a format external to database;
   receiving a formatter code from a third-party entity system configured to handle the format external to the database, wherein the third-party entity system is external to a system of the database and the third-party system external to the system of the database provided program code of the formatter code; and
   using a formatter of the database to format the specified data between the format of the database and the format external to the database, wherein formatting the specified data includes changing the format of the specified data, the formatter has been integrated with the database using the received formatter code defined external to the database and the specified data is stored in the database in the format of the database and the formatter code defined external to the database and received from the third-party system external to the system of the database has been validated for security before being authorized to be utilized to integrate the formatter with the database.

2. The method of claim 1, wherein the specified data includes data to be imported into the database and using the formatter to format the specified data includes formatting the specified data in the format external to the database to the format of the database.

3. The method of claim 1, wherein the specified data includes data to be exported from the database and using the formatter to format the specified data includes formatting the specified data in the format of the database to the format external to the database.

4. The method of claim 1, wherein the format external to database includes a format not natively supported by the database.

5. The method of claim 1, wherein the formatter includes a programming function of the database included in a library of programming functions of the database.

6. The method of claim 5, wherein the formatter has been generated at least in part by compiling the formatter code provided by the third-party entity system external to the system of the database and the formatter code has been programmed using an Application Programming Interface.

7. The method of claim 1, wherein using the formatter to format the specified data includes creating a database table associated with the formatter.

8. The method of claim 7, wherein the specified data can be written to the database table to export the specified data using the formatter.

9. The method of claim 7, wherein the formatted specified data can be read from the database table to access the specified data imported using the formatter.

10. The method of claim 1, further comprising using a communication protocol not natively supported by the database to transfer data associated with the specified data.

11. The method of claim 10, wherein the communication protocol is an object of the database.

12. The method of claim 11, wherein the communication protocol has been defined as the object of the database using one or more programming functions in a library of functions of the database and the one or more programming functions has been generated using a protocol code defined external to the database.

13. The method of claim 10, wherein using the formatter to format the specified data includes defining a table in the database using a first parameter that specifies the formatter and a second parameter that specifies the communication protocol.

14. The method of claim 10, wherein the communication protocol is associated with a restriction that only allows one or more identified users to use the communication protocol with the database.

15. A database system, comprising
a communication interface configured to receive an indication of a specified data to be formatted between a format of a database and a format external to database and receive a formatter code from a third-party entity system configured to handle the format external to the database, wherein the third-party entity system is external to the database system and the third-party system external to the system of the database provided program code of the formatter code; and
a processor configured to use a formatter of the database system to format the specified data between the format of the database and the format external to the database, wherein formatting the specified data includes changing the format of the specified data, the formatter has been integrated with the database using the received formatter code defined external to the database and the specified data is stored in the database in the format of the database and the formatter code defined external to the database and received from the third-party system external to the system of the database has been validated for security before being authorized to be utilized to integrate the formatter with the database.

16. The system of claim 15, wherein the communication interface is further configured to use a communication protocol not natively supported by the database system to transfer data associated with the specified data.

17. The system of claim 16, wherein the processor is configured to use the formatter to format the specified data including by defining a table in the database using a first parameter that specifies the formatter and a second parameter that specifies the communication protocol.

18. The system of claim 15, wherein the processor is further configured to use a communication protocol not natively supported by the database to transfer data associated with the specified data.

19. A computer program product for formatting data, the computer program product being embodied in a tangible non-transitory computer readable storage medium and comprising computer instructions for:
receiving an indication of a specified data to be formatted between a format of a database and a format external to database;
receiving a formatter code from a third-party entity system configured to handle the format external to the database, wherein the third-party entity system is external to a system of the database and the third-party system external to the system of the database provided program code of the formatter code; and
using a formatter of the database to format the specified data between the format of the database and the format external to the database, wherein formatting the specified data includes changing the format of the specified data, the formatter has been integrated with the database using the received formatter code defined external to the database and the specified data is stored in the database in the format of the database and the formatter code defined external to the database and received from the third-party system external to the system of the database has been validated for security before being authorized to be utilized to integrate the formatter with the database.

20. The computer program product recited in claim 19, further comprising using a communication protocol not natively supported by the database to transfer data associated with the specified data.

* * * * *